US012279606B2

(12) United States Patent
Knox et al.

(10) Patent No.: US 12,279,606 B2
(45) Date of Patent: Apr. 22, 2025

(54) WILDLIFE DETECTION AND DETERRENT SYSTEM AND METHOD FOR ENVIRONMENTAL INSTRUMENTATION

(71) Applicant: PROA HOLDINGS PTY LTD, Balwyn (AU)

(72) Inventors: Alistair Knox, Carlton (AU); Victor Depoorter Ruelle, Carlton (AU)

(73) Assignee: PROA HOLDINGS PTY LTD, Balwyn (AU)

( * ) Notice: Subject to any disclaimer, the term of this patent is extended or adjusted under 35 U.S.C. 154(b) by 0 days.

(21) Appl. No.: 18/043,747

(22) PCT Filed: Jul. 16, 2021

(86) PCT No.: PCT/AU2021/050762
§ 371 (c)(1),
(2) Date: Mar. 2, 2023

(87) PCT Pub. No.: WO2022/047519
PCT Pub. Date: Mar. 10, 2022

(65) Prior Publication Data
US 2023/0309549 A1    Oct. 5, 2023

(30) Foreign Application Priority Data

Sep. 3, 2020  (AU) .............................. 2020903149

(51) Int. Cl.
*A01M 29/00*    (2011.01)
*A01M 29/06*    (2011.01)
(Continued)

(52) U.S. Cl.
CPC ............ *A01M 29/32* (2013.01); *A01M 29/06* (2013.01); *A01M 29/16* (2013.01); *B08B 3/024* (2013.01); *B08B 13/00* (2013.01)

(58) Field of Classification Search
CPC ...... A01M 29/00; A01M 29/06; A01M 29/08; A01M 29/10; A01M 29/16; A01M 29/18; A01M 29/20; A01M 29/22; A01M 29/32
See application file for complete search history.

(56) References Cited

U.S. PATENT DOCUMENTS 5,463,595 A    10/1995  Rodhall et al.
7,462,364 B2 *  12/2008  Bell ..................... A01N 25/02
                                                        424/405

(Continued)

FOREIGN PATENT DOCUMENTS

CN    108477139    9/2018
CN    208318088    1/2019

(Continued)

OTHER PUBLICATIONS

International Search Report mailed on Oct. 13, 2021 by the International Searching Authority for International Application No. PCT/AU2021/050762, filed on Jul. 16, 2021 and published as WO/2022/047519 on Mar. 10, 2022 (Applicant-PROA Holdings PTY Ltd) (8 Pages).

(Continued)

*Primary Examiner* — Joshua J Michener
*Assistant Examiner* — Henry Hooper Mudd
(74) *Attorney, Agent, or Firm* — Ballard Spahr LLP (57) ABSTRACT

Described herein is a deterrence system for deterring animals from a vicinity of an environment monitoring apparatus, the system includes: a detector system having at least one sensor configured to generate a presence signal indicative of the presence of an object within a predefined vicinity of the environment monitoring apparatus; a deterrence processing system; and a repulsion system, wherein the deterrence processing system is configured to: monitor the presence signal; determine, from the presence signal, the presence of an object within the predefined vicinity of the (Continued)

environment monitoring apparatus; and communicate a command for the repulsion system to perform a sequence of one or more repulsion events actions in response to determining that an object is present, and wherein the repulsion system is configured to: perform one or more repulsion events responsive to receipt of the command from the deterrence processing system.

24 Claims, 7 Drawing Sheets

(51) Int. Cl.
    *A01M 29/16*     (2011.01)
    *A01M 29/32*     (2011.01)
    *B08B 3/02*     (2006.01)
    *B08B 13/00*     (2006.01)

(56) References Cited

U.S. PATENT DOCUMENTS

| | | |
|---|---|---|
| 10,519,932 B2 | 12/2019 | Wenger et al. |
| 11,856,938 B1 * | 1/2024 | Bart ...................... A01M 29/00 |
| 2008/0017132 A1 | 1/2008 | Merrifield et al. |
| 2009/0261180 A1 * | 10/2009 | Donoho .................... B05B 3/00 239/69 |
| 2018/0015492 A1 * | 1/2018 | Morris .................... B05B 12/12 |
| 2018/0177178 A1 * | 6/2018 | Bhakta .................. A01M 29/16 |
| 2019/0246623 A1 * | 8/2019 | Tews ...................... A01M 29/00 |
| 2020/0323193 A1 * | 10/2020 | King ...................... A01M 29/00 |
| 2021/0137097 A1 * | 5/2021 | Henskes ............... A01M 29/10 |

FOREIGN PATENT DOCUMENTS

| | | |
|---|---|---|
| JP | 3225896 | 11/2001 |
| JP | 2013/192486 | 9/2013 |
| KR | 101874564 | 7/2018 |

OTHER PUBLICATIONS

Written Opinion of the International Searching Authority mailed on Oct. 13, 2021 by the International Searching Authority for International Application No. PCT/AU2021/050762, filed on Jul. 16, 2021 and published as WO/2022/047519 on Mar. 10, 2022 (Applicant-PROA Holdings PTY Ltd) (12 Pages).

* cited by examiner

Figure 7

WILDLIFE DETECTION AND DETERRENT SYSTEM AND METHOD FOR ENVIRONMENTAL INSTRUMENTATION

CROSS-REFERENCE TO RELATED APPLICATIONS

This application is a U.S. National Phase Application of International Application No. PCT/AU2021/050762 filed Jul. 16, 2021, which claims priority to Australian Application No. 2020903149, filed Sep. 3, 2020, each of which are hereby incorporated by reference in their entirety.

FIELD OF THE INVENTION

The invention generally relates to systems and methods for deterring animals from the vicinity of an environment monitoring apparatus.

BACKGROUND TO THE INVENTION

Remote automated sensing systems are increasingly used for weather monitoring, cloud and solar sensing, wind monitoring and security. In particular sky cameras are of increasing importance to solar farms. Like all systems installed outdoors it must be robust and resistant to the weather but additionally it must also not be affected by wildlife, especially birds.

SUMMARY OF THE INVENTION

According to the present disclosure, there is provided a deterrence system for deterring animals from a vicinity of an environment monitoring apparatus, the system comprising: a detector system comprising at least one sensor configured to generate a presence signal indicative of the presence of an object within a predefined vicinity of the environment monitoring apparatus; a deterrence processing system; and a repulsion system, wherein the deterrence processing system is configured to: monitor the presence signal; determine, from the presence signal, the presence of an object within the predefined vicinity of the environment monitoring apparatus; and communicate a command for the repulsion system to perform a sequence of one or more repulsion events actions in response to determining that an object is present, and wherein the repulsion system is configured to: perform one or more repulsion events responsive to receipt of the command from the deterrence processing system.

The environment monitoring apparatus may be mounted on a pole and/or may be configured for obtaining sensor measurements of at least a portion of the sky, such as a skycam or pyranometer.

Optionally, the detector system comprises one or more of: an infrared detector; a motion detector; a time-of-flight camera; a microwave movement sensor; an ultrasonic sensor; a photoelectric sensor; a laser range-finding sensor; and a capacitive proximity sensor. The detector system may be mounted at a distance from the environment monitoring apparatus with at least one sensor facing the optical apparatus.

Optionally, the deterrence processing system is further configured to: perform a first temporal check to determine whether the presence signal has indicated the presence of the object for at least a first predefined time, and wherein the command is only communicated when the temporal check determines that the object has been present for the predefined time.

The sequence may comprise one repulsion event. The one repulsion event may comprise one or more of: at least one non-physical repulsion action; and at least one physical repulsion action. The at least one non-physical repulsion action may be selected from a visual repulsion action and an audible repulsion action. The at least one physical repulsion action may include moving an object into a vicinity of the optical apparatus.

Alternatively, the sequence may comprise at least an initial repulsion event and a subsequent repulsion event. The deterrence processing system may be further configured to: communicate a first command for the repulsion system to perform the initial repulsion event in response to determining that an object is present; perform a second temporal check to determine whether the presence signal has indicated the presence of the object for at least a second predefined time subsequent to the performance of the initial repulsion event; communicate a second command for the repulsion system to perform the subsequent repulsion event in response to determining that the object is still present after the second predefined time. The initial repulsion event may comprise one or both of: a visual repulsion action; and an audible repulsion action. The subsequent repulsion event may comprise a physical repulsion action.

A physical repulsion action may comprise moving a cleaning arm of a self-cleaning system through a path in which at least a portion of the cleaning arm moves within the vicinity of the environment monitoring apparatus. Optionally the self-cleaning system is according to the aspects mentioned below.

In an embodiment, the distance discrimination system is further configured to: determine a distance between the environment monitoring apparatus and a detected object; communicate a command for the repulsion system to perform one or more repulsion event only in response to determining that the object is further than a predefined minimum distance.

In an embodiment, the environment monitoring apparatus comprises an optical apparatus. The environment monitoring apparatus may comprise a substantially upward facing sensing portion.

The system may be configured to record in a log and/or the communicate to an external computer instances of undertaking one or more repulsion events actions. Optionally, the system further comprises a communication system configured to receive communications from an external computer, said communications including commands from the external computer via the communication system for controlling the deterrence processing system, environment monitoring apparatus and/or repulsion system remotely. Also, or alternatively, the system may also further comprise a communication system configured to send communications to an external computer, said communications including monitoring communications.

According to another aspect of the present disclosure, there is provided a deterrence method for deterring animals from a vicinity of an environment monitoring apparatus, comprising the steps of: generating a presence signal indicative of the presence of an object within a predefined vicinity of the environment monitoring apparatus; monitoring the presence signal; determining, from the presence signal, the presence of an object within the predefined vicinity of the environment monitoring apparatus; and performing one or more repulsion actions responsive to receipt of the command from the deterrence processing system.

According to another aspect of the present disclosure, there is provided a self-cleaning system for cleaning an environment monitoring apparatus, the system comprising: a cleaning arm having a nozzle; a drive unit configured to move the cleaning arm about a path; a reservoir in fluid communication with the nozzle; a pump; and a cleaning processing module configured to control operation of the drive unit and the pump, wherein the cleaning processing module is configured to: control the drive unit to move the cleaning arm about the path; and control the pump to cause a movement of liquid from the reservoir to the nozzle such that the liquid exits the nozzle, wherein the path and nozzle are configured such that the liquid is caused to contact an active area of the environment monitoring apparatus, thereby causing cleaning of the environment monitoring apparatus.

Optionally, the environment monitoring apparatus is mounted on a structure, such as a pole, and/or configured for obtaining senor measurements of at least a portion of the sky, such as a skycam. The cleaning arm and nozzle may be located in proximity to the environment monitoring apparatus and the reservoir may be found in proximity to a base of the pole.

Optionally, the cleaning processing module is configured to control cleaning of the environment monitoring apparatus periodically and/or according to a predefined schedule.

The fluid communication may comprise flexible and/or non-flexible tubing.

According to an embodiment, the environment monitoring apparatus comprises an optical apparatus. The environment monitoring apparatus may comprise a substantially upward facing sensing portion.

In an embodiment there is provided a self-cleaning system wherein the nozzle is one of multiple nozzles, the system further comprising a valve system comprising at least one valve for controlling activation of the multiple nozzles, wherein an activated nozzle allows liquid to exit, and wherein the cleaning processing module is further configured to: control the pump and valve(s) to cause a movement of liquid from the reservoir to selected one or more nozzles such that the liquid exits said selected nozzle(s) to contact a part of the active area of the environment monitoring apparatus, and thereafter cause a further movement of liquid to another selected one or more of the multiple nozzles such that the liquid contacts another part of the active area.

The cleaning processing module can be further configured to control the pump and valve(s) to cause movement of liquid such that it is directed to individual nozzles in succession thereby performing a sequence of nozzle emissions such that the substantially the entire active area is contacted.

The cleaning arm is one of multiple cleaning arms and/or the sensing portion is one of multiple sensing portions.

In another embodiment, there is provided a self-cleaning system further comprising a communication system configured to communicate between an external computer and the self-cleaning system; and wherein the self-cleaning system is further configured to receive commands from the external computer via the communication system for controlling the cleaning processing system, environment monitoring apparatus and/or self-cleaning system remotely, and/or to communicate monitoring information.

The system may be further configured to record in a log and/or the communicate to an external computer instances of undertaking one or more repulsion events actions.

According to another aspect of the present disclosure, there is provided a self-cleaning method for cleaning an environment monitoring apparatus, comprising the steps of: moving a cleaning arm having a nozzle along a path; pumping liquid from a reservoir to the nozzle thereby causing the liquid to exit the nozzle as the cleaning arm moves along the path, wherein the path and nozzle are configured such that the liquid is caused to contact an active area of the environment monitoring apparatus, thereby causing cleaning of the environment monitoring apparatus.

In an embodiment, there is provided a self-cleaning method further comprising the steps of: providing at least one cleaning arm with multiple nozzles; controlling at least one valve to direct the pumped liquid from the reservoir to selected one or more nozzles in succession; and wherein the valve(s), nozzles and/or path are configured such that the liquid exits each nozzle in succession in a sequence of nozzle emissions to contact substantially the active area thereby causing cleaning of the optical apparatus with maximal water pressure from each nozzle.

Optionally, the pump, path and/or nozzle(s) can be configured to cause the liquid to exit the nozzle(s) at low pressure over substantially the active area thereby soaking the active area before cleaning of the optical apparatus.

According to another aspect of the present disclosure, there is provided a deterrence system for deterring animals from a vicinity of an environment monitoring apparatus, the system comprising: at least one sensor configured to detect the presence of an object within a predefined vicinity of the environment monitoring apparatus; a deterrence processing system; and a repulsion system for performing one or more repulsion actions for repelling the object, wherein the deterrence processing system is configured to: determine the presence of an object within the predefined vicinity of the environment monitoring apparatus; and control the repulsion system to perform a sequence of one or more repulsion events actions in response to determining that an object is present.

According to another aspect of the present disclosure, there is provided a deterrence method for deterring animals from a vicinity of an environment monitoring apparatus, comprising the steps of: determining the presence of an object within the predefined vicinity of the environment monitoring apparatus; and performing one or more repulsion actions responsive to determining the presence of the object.

According to another aspect of the present disclosure, there is provided a solar farm comprising one or more deterrence systems according to the above aspects.

As used herein, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawings, in which.

DESCRIPTION OF EMBODIMENTS

Figure 1:
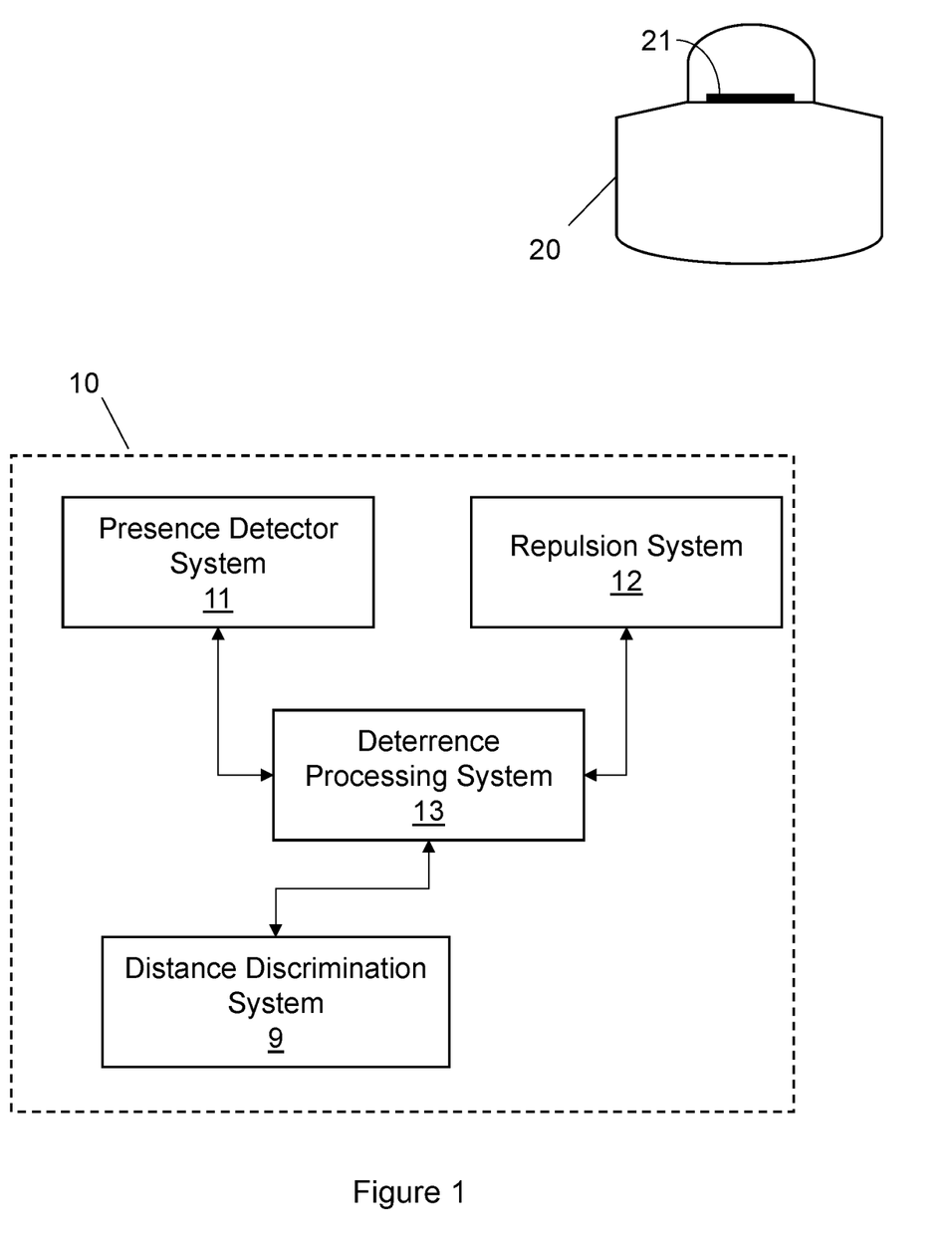
FIG. 1 shows a deterrence system according to an embodiment.

FIG. 1 shows schematically a deterrence system 10 according to an embodiment. The system 10 may be used for deterring animals (such as birds) from being in the vicinity of or landing on an environment monitoring apparatus 20 for monitoring at least one environment variable. The system 10 comprises a detector system 11, and a repulsion system 12, each interfaced with a deterrence processing module 13.

According to this embodiment, the environment monitoring apparatus 20 is an optical apparatus typically comprising an optical sensor 21 configured to receive electromagnetic radiation—this can be optical radiation, infrared radiation, ultraviolet radiation, and/or any other required spectra. The electromagnetic radiation, in this case, corresponds to an environment variable. Advantageously, the environment monitoring apparatus 20 may be suitable for ongoing use in a location that is infrequently monitored by people and/or difficult to access—for example, in a country or desert region, or in an urban environment atop a tall mast. The environment monitoring apparatus 20 is configured to record and/or transmit data corresponding to the sensed environment variable—for example, an optical apparatus can be configured to record a time series of images (which may be a video). The quality of operation of the environment monitoring apparatus 20 may be dependent on a consistent sensing efficiency. Such an optical apparatus may be configured for imaging the sky and may be selected from: sky/cloud cameras; pyranometers; pyrheliometers, UV sensors, Lidar, and ceilometers.

In an embodiment, the environment monitoring apparatus 20 includes a non-optical apparatus (separately or in addition to an optical sensor 21). An example non-optical apparatus is a SODAR device. For the purposes of the present disclosure, it is assumed that the environment monitoring apparatus 20 comprises an optical apparatus.

An example environment monitoring apparatus 20 is used for weather monitoring. Such an environment monitoring apparatus 20 may be a "sky camera", which are of increasing importance to solar farms. For example, a sky camera is utilised by the present Applicant's solar forecasting system (Proa Forecasting System (PFS)) as described at the following resources:

https://proa.energy/solutions/expert-services/
"Proa Analytics Solar Forecasts Project—LESSONS LEARNT REPORT 2" https://arena.gov.au/assets/2020/07/proa-analytics-solar-forecasting-lessons-learnt-report-2. pdf.

A particular problem can be the presence of birds or bird droppings, which may have a profound influence on the operation of the environment monitoring apparatus 20. Birds may roost, nest, or defecate on the environment monitoring apparatus 20, compromising the accuracy of the collected data, and diminishing its value.

Figure 2:
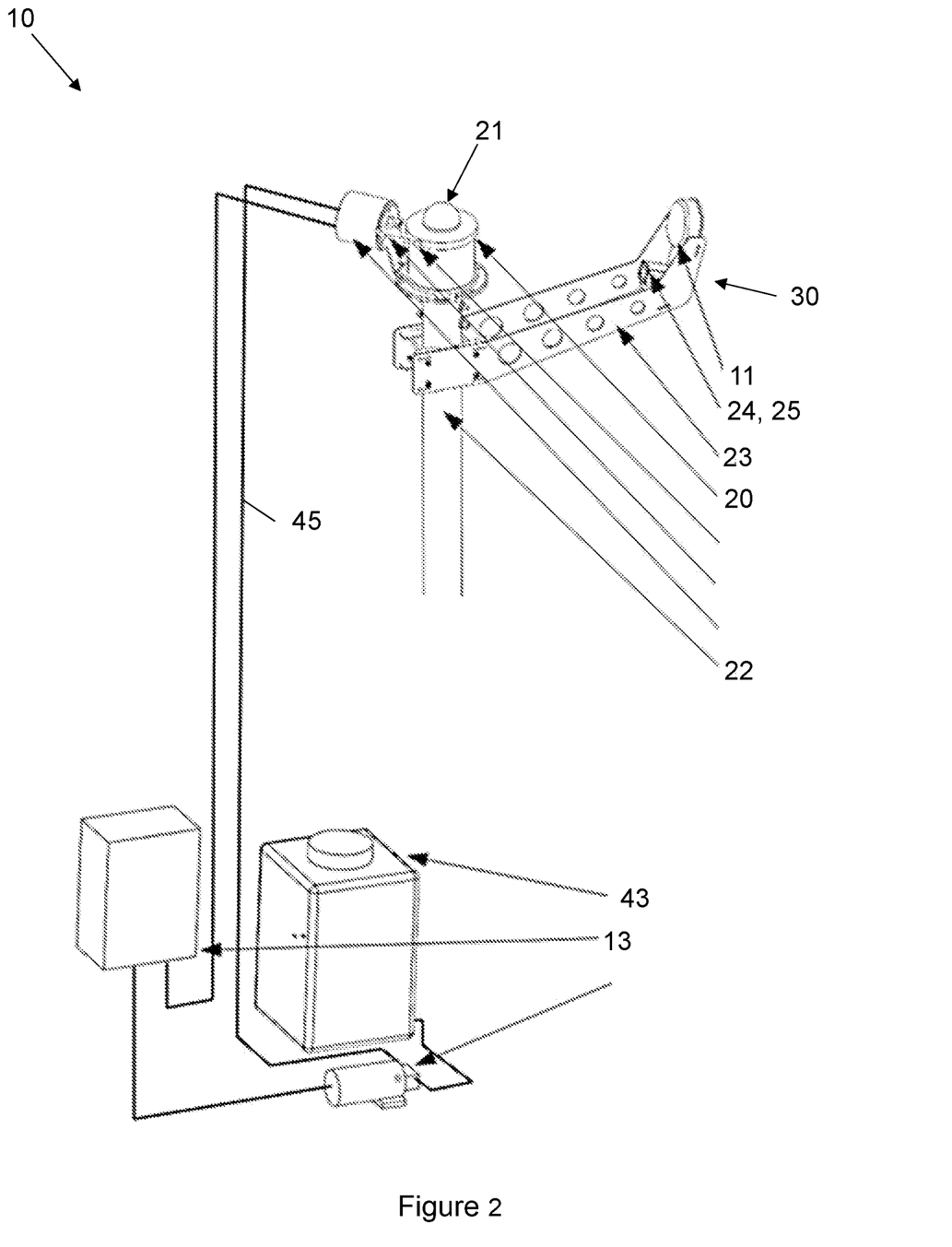
FIG. 2 shows an embodiment wherein an optical apparatus mounted atop a pole.

FIG. 2 shows an embodiment of system 10, wherein the environment monitoring apparatus 20 is mounted atop a pole 22. More generally, the environment monitoring apparatus 20 may be mounted onto (e.g. atop) a structure, such as a building. As shown, the environment monitoring apparatus 20 monitors the sky—in this case, the optical sensor 21 corresponds to an upward facing camera 21. The system 10 comprises detector system 11, which can comprise a motion detector depending on the implementation. The detector system 11, according to an embodiment, is configured to generate a presence signal indicative of the presence of an object, such as an animal, with a vicinity of the environment monitoring apparatus 20. In an embodiment, the presence signal is also generated when the animal is in physical contact with the environment monitoring apparatus 20. For example, for detection, the maximum distance from the environment monitoring apparatus 20 can be between 1 metre and 3 metres, depending on the implementation.

The detector system 11 is interfaced with the deterrence processing module 13 such that the presence signal is communicated to the deterrence processing module 13. In an embodiment, the presence signal directly indicates the presence of an animal—for example, the presence signal may comprise an indication of state. In another embodiment, the presence signal is processed by the deterrence processing module 13, which determines, based on a property of the presence signal, whether an animal is present. For example, the presence signal may correspond to an analogue signal which is analysed by the deterrence processing module 13. In either case, the deterrence processing module 13 is configured to identifying from the presence signal that an animal is present within a vicinity of the environment monitoring apparatus 20.

According to an embodiment, as shown in FIG. 2, the detector system 11 is located at a distance from the environment monitoring apparatus 20. In this embodiment, arm 23 is provided extending from pole 22, with a distal end 30 of the arm 23 having attached the detector system 11. The detector system 11 is oriented such as to detect the presence of an animal in the vicinity of the environment monitoring apparatus 20.

The detector system 11 can comprise, for example, at least an infrared detector configured to identify the presence of an animal. Other examples include one or more of: a microwave movement sensor (utilising the Doppler effect); an ultrasonic sensor (utilising time of flight); a photoelectric sensor (for example, either through-beam or reflected-beam); a laser range-finding sensor; and a capacitive proximity sensor.

According to an embodiment (not shown), the detector system 11 is located with one or more detectors next to the environment monitoring apparatus 20. Such detectors may be facing outwards (i.e. away from the environment monitoring apparatus 20) and are configured to identify animals as they approach the environment monitoring apparatus 20.

Figure 3:
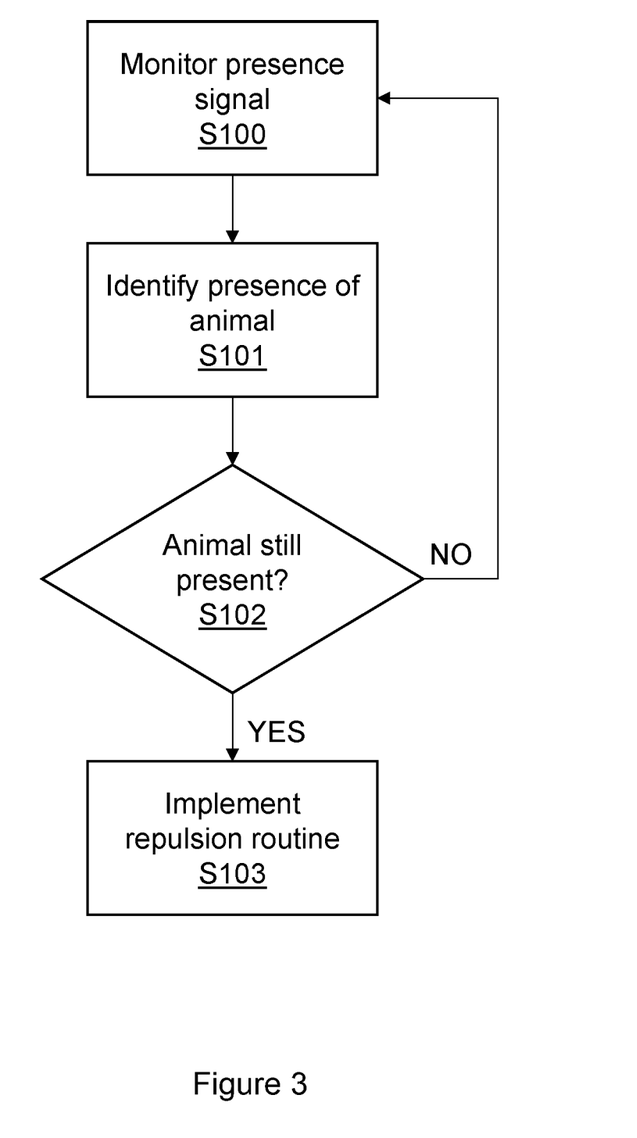
FIG. 3 shows a method implemented by a deterrence processing module according to an embodiment

FIG. 3 shows a method implemented by the deterrence processing module 13 for determining the presence of an animal in the vicinity of the optical apparatus 20, according to an embodiment.

At step S100, the deterrence processing module 13 monitors the presence signal received from the detector system 11.

At step S101, the deterrence processing module 13 identifies, from the presence signal, an instance of an animal being detected within the vicinity of the optical apparatus 20.

Optionally, at step S102, the deterrence processing module 13 performs a temporal check to determine if the presence signal has indicated the presence of the animal for at least a predefined time.

In this case, in response to the predefined time elapsing with the animal still being detected as present, the deterrence processing module 13 proceeds to implement one or more repulsion events via repulsion system 12, at step S103.

Where the optional temporal check is not utilised, the method proceeds directly to step S103. In response to the animal not being present after the predefined time elapsing, the method returns to step S100.

The repulsion system 12 is controlled by the deterrence processing module 13 to perform one or more repulsion events. According to an embodiment, there is a single repulsion event. Advantageously, a single repulsion event may simplify operation of the system 10. According to another embodiment, there are a plurality of repulsion events including an initial repulsion event and at least one subsequent repulsion event. Advantageously, multiple repulsion events provide for an escalation capability of the system 10—that is, a subsequent repulsion event may provide a better chance of repelling the animal when compared to an earlier repulsion action. The, or each, repulsion event comprises one or more repulsion actions.

Referring back to FIG. 2, there can be provided a non-physical repulsion action such as an audible repulsion action comprising emitting a sound and/or visual repulsion action comprising directing a light towards the animal. For example, the system 10 can comprise a speaker 24 and/or a light source 25 (which may provide for a bright flash). According to an embodiment, an initial repulsion action is a non-physical repulsion action. Advantageously, such initial repulsion action may require relatively low energy usage to instigate, does not affect the operation of the environment monitoring system 20, and/or does not require a physical interaction with the animal.

In an embodiment, the deterrence processing module 13 is further configured to determine a distance of detected objects from the environment monitoring apparatus 20. The distance is compared to a predefined minimum distance (which may be set by a user or communicated to the deterrence processing module 13) such that the deterrence processing module 13 determines whether the object is closer to or further from the environment monitoring apparatus 20 than the predefined minimum distance. It is expected the predefined minimum distance would be about 1 m for most situations, however the predetermined minimum distance could be varied depending on the specific arrangement of the apparatus, the wildlife to be detected and the environment. For example, for more effective integration with at least one of the sensors, i.e. the microwave movement sensor, the predefined minimum could be less than 1 m. Thus the predefined minimum distance can be in the range of between 0.75 m to 1.25 m or 0.5 m to 1.0 m. In the event that the object is closer than the predefined minimum distance, the repulsion system 12 is not activated.

For example, it is expected that animals, in particular flying animals such as birds, are usually initial detected further away than the predefined minimum distance to the environment monitoring apparatus 20. Therefore, this embodiment may advantageously reduce or avoid instances of activation of the repulsion system 12 due to non-animal objects being detected by the detector system 11. A particular example of a non-animal object is detection due to environmental factors such as rain. Although the embodiment may result in non-activation of the repulsion system 12 when an animal is in fact present (due to an object, corresponding to the animal, being detected too close or, for example, being present during rain), this may be preferred in certain implementations when compared to activation occurring when not needed (due to, for example, measurement interference or power supply considerations).

In an implementation, the detector system 11 itself is configured for providing distance information—that is, not simply a presence or absence of an object, but further, a distance to said object. For example, where the detector system 11 utilises a radar sensor. In a particularly preferred example, the radar sensor is a radar transceiver having characteristics of being low cost, compact, and able to operate stably over a range of temperatures. In another implementation, a separate sensor is provided for determining whether the object is within the predefined minimum range.

Figure 7:
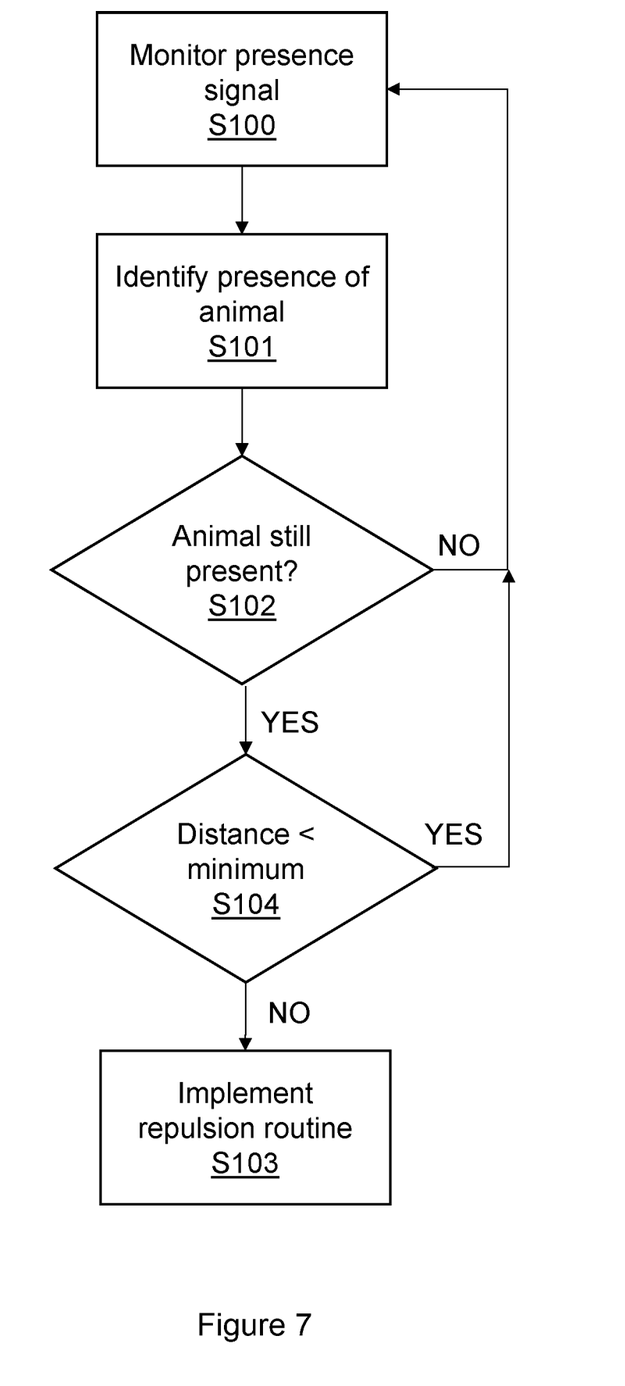
FIG. 7 shows a modification to the method of FIG. 3 whereby a repulsion even does not occur if an object is too close.

FIG. 7 shows a modification to the method of FIG. 3, and steps S100-S103 are equivalent. At additional step S104, the deterrence processing module 13 performs a distance check to determine whether the object is present within the predefined minimum distance. In this case, the method returns to step S100 without taking a repulsion action. Otherwise, the deterrence processing module 13 proceeds to implement one or more repulsion events via repulsion system 12, at step S103.

Although S104 is shown, in FIG. 3, as being performed after step S102, it can be understood that the two steps may be interchangeable within the method or may be effectively performed simultaneously. It should be clear that the method of FIG. 6 may similarly be modified to include a check against the predefined minimum distance.

Figure 4:
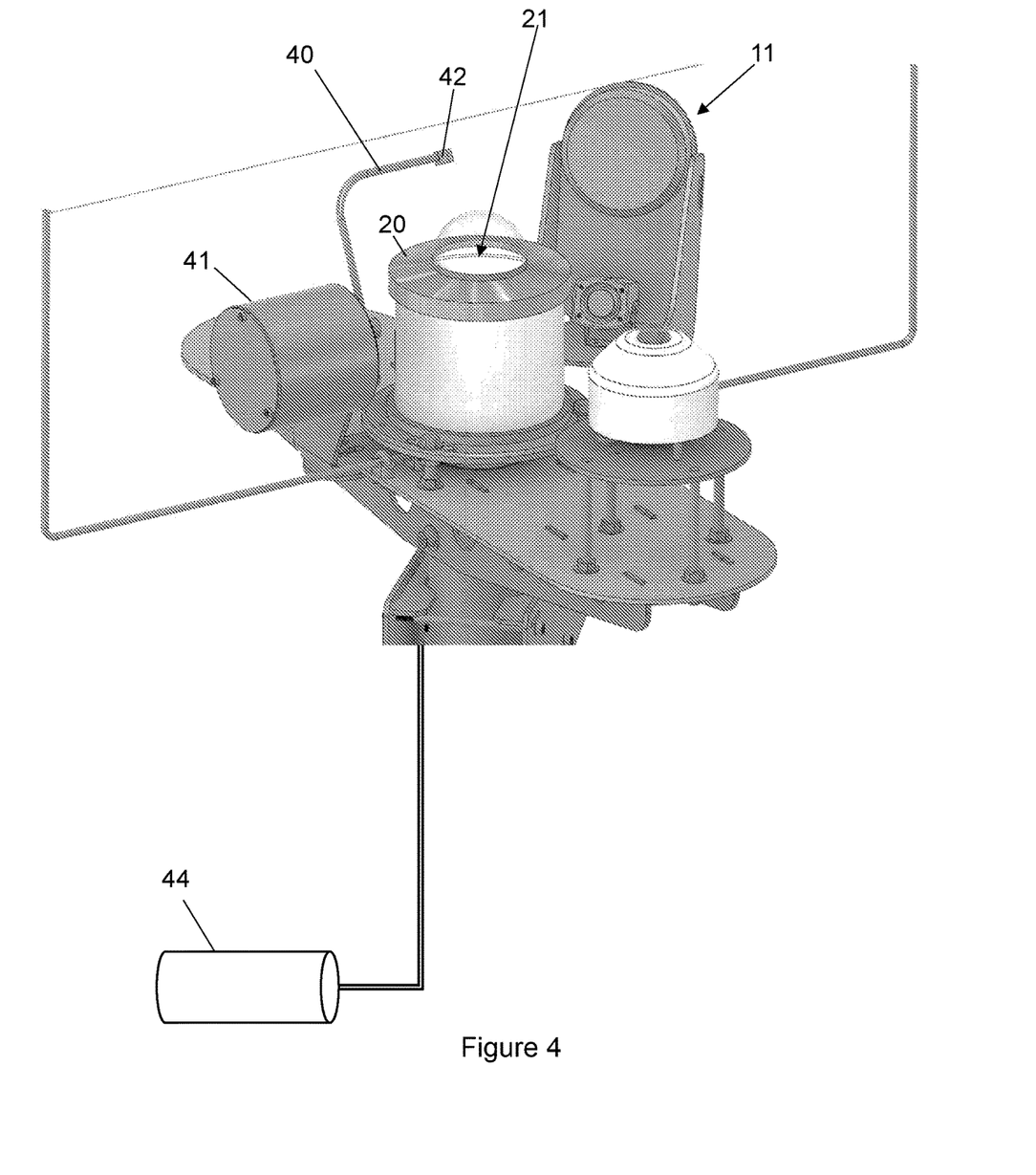
FIG. 4 shows a self-cleaning system according to an embodiment.

According to an embodiment, a self-cleaning system is provided configured to undertake a cleaning action in order to remove interference from the environment monitoring system 20. For example, such interference includes dust and dirt. Referring to FIG. 4, the self-cleaning system comprises a cleaning arm 40 coupled to a drive unit 41. The drive unit 41 is configured to cause a movement of the cleaning arm 40. The cleaning arm 40 comprises a nozzle 42 to which liquid can be supplied from a reservoir 43. A pump 44 is provided to effect movement of the liquid to the nozzle 42, for example, via conduit 45.

In other embodiments, the cleaning arm 40 can have more than one nozzle 42 or the system can have multiple cleaning arms 40 which can have one or more nozzles or heads 42. In either case, the system according to these embodiments comprises multiple nozzles 42. The self-cleaning system can also comprise a valve system having one or more valves 46 which can be controllably opened and closed so as to direct movement of water from the reservoir 43 to selected one or more of the nozzles 42, for example, according to a predefined cleaning routine. For example, the valves can be electrically controllable valves such as solenoid valves, but other controllable valves can be used. In an implementation, sufficient controllable valves 46 are provided such that each nozzle 42 can be individually activated (and deactivated) for cleaning. In another implementation, the nozzles 42 are arranged into two or more groups, each comprising one or more nozzles 42, and the valves 46 are arranged such that each group of nozzles 42 is individually controllable such that all nozzles 42 of a particular group can simultaneously be activated (and deactivated) for cleaning Referring to FIG. 5, according to an embodiment, the drive unit 41 and pump 44 can be controllable via cleaning processing module 14, or at least, each may undertake a predefined operation in response to a signal generated by the cleaning processing module 14.

Figure 5:
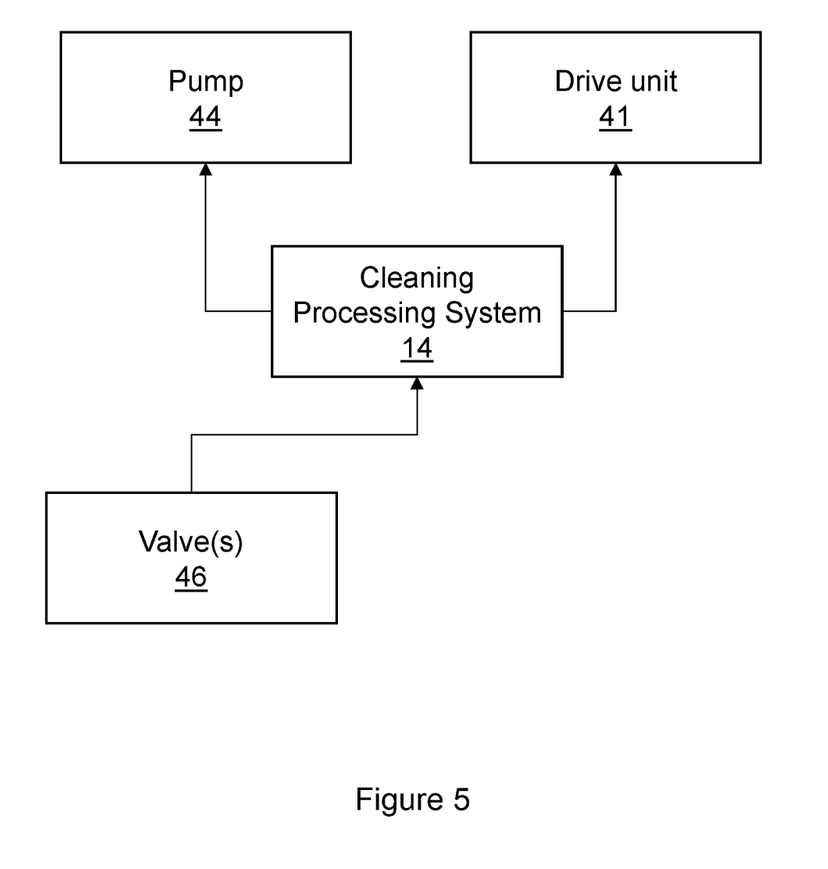
FIG. 5 shows a relationship between a cleaning processing module, a pump, and a drive unit.

According to an embodiment, the cleaning processing module 14 is configured to activate the drive unit 41 and the pump 44 from time to time, for example, according to a predefined schedule or periodically according to a predefined period. Such activation can be termed a cleaning action. During a cleaning action, the cleaning arm 40 is moved by the drive unit 41 and liquid is pumped out of the nozzle 42 via operation of the pump 44. The nozzle 42 is moved along a path and is generally configured to spray the liquid towards the environment monitoring apparatus 20. In particular, onto an active area of the environment monitoring apparatus 20 such as a lens or window through which an optical sensor 21 operates. The movement of the cleaning arm 40 results in the nozzle 42 being directed over the entire active area, or at least, a substantial portion of the active area to effect useful cleaning of the active area. The sprayed liquid acts to remove dirt and dust, and other contaminants.

In an embodiment where there are multiple nozzles 42, the cleaning processing module 14 can be configured to control the pump 44 and the valve system 46 so as to cause a movement of liquid from the reservoir 43 to a first one of the multiple nozzles 42 (or a first group of one or more nozzles 42) such that the liquid exits that first nozzle 42 (or one or more nozzles 42 of the first group) to contact at least a part of the active area. Then the cleaning processing module 14 is configured to control the pump 44 and valve(s) 46 to cause a movement of liquid to a second one of the multiple nozzles 42 (or a second group of one or more nozzles 42) to contact a different part of the active area (there may, of course, be overlap in the coverage of the active area). This then repeats, if applicable, for a third, fourth and so on, for each nozzle 42 in succession to perform a sequence of nozzle emissions until the entire active area is contacted by the liquid thereby cleaning the active area.

By only activating one nozzle 42 (or a group of the multiple nozzles 42) at a time, the pressure of the liquid exiting the nozzle 42 is improved when compared to activating all nozzles 42 at the same time. Therefore, the embodiment may advantageously optimise the cleaning ability of the liquid. By having the nozzles 42 arranged so as to have the exiting liquid contact at least part of the active area by a single nozzle at maximal pressure and the sequence of nozzles 42 activated in succession so as to cause substantially the entire area to be cleaned, the cleaning process is more efficient and effective. In the case of groupings of nozzles 42, an advantage may be provided by allowing for a desired trade-off between cleaning time (and therefore energy use) and the desire for higher pressure.

Referring back to FIG. 2, the reservoir 43 can be located at, or near, the base of pole 22—the conduit, which can include flexible and/or non-flexible tubing, couples the reservoir 43 and the nozzle 44 by extending up the pole 22. Advantageously, the reservoir 43 being at the base of the pole 22 may enable easy access for refiling and may reduce a weight loading on the pole 22. The pump 44 can be located near the reservoir 43.

The self-cleaning system advantageously enables for cleaning of the environment monitoring apparatus 20 in an automated manner—there is no requirement for a user to be present. Thus, the time over which the environment monitoring apparatus 20 may be utilised without intervention by a user can be extended.

According to an embodiment, the self-cleaning system may also be utilised for a repulsive action. For example, the cleaning arm 40 is moveable along a path which moves over the environment monitoring apparatus 20. This motion may provide an incentive to any animal that moves into the vicinity of the environment monitoring apparatus 20 to then move away. Thus, the associated repulsion action corresponds to movement of the cleaning arm 40, optionally along the same entire path as utilised during cleaning, such as to cause the cleaning arm 40 and nozzle 43 to physically interfere with the animal or at least scare the animal from landing on the environment monitoring apparatus 20. This repulsive action may be considered a physical repulsion action as it physically interferes with the animal's ability to reach or stay perched on the environment monitoring apparatus 20. Generally, it is not required that liquid is involved when using the cleaning arm 40 for repulsion—that is, the pump 44 is not necessarily activated.

Advantageously, this embodiment can utilise the same hardware for both cleaning and repulsion of animals, providing for fewer components when compared to two separate systems. Also, this embodiment may have the advantage of reducing or eliminating the incidence of bird droppings being deposited on the environment monitoring apparatus 20—such droppings may be more difficult to remove than dirt and dust.

Thus optionally, the self-cleaning system can be further configured to perform a soaking step before the cleaning step which has been described above. In this soaking step, the pump, path and/or nozzles 42 are configured to cause the liquid to exit one or more the nozzles 42 so as to cover the active area and to allow it to soak into any mud or droppings. After a predetermined period of time (selected to allow the liquid to soak the mud or dropping sufficiently), the self-cleaning system can then be configured to perform the cleaning step. It is envisaged that high water pressure is likely not necessary or of lower nee, and therefore multiple nozzles, if not all the nozzles 42, may be employed to perform the soaking. Further only a small amount of liquid is likely required and therefore the nozzles 42 are only utilised for a short period of time for soaking.

The processing modules 13, 14 can be implemented by a programmable logic controller (PLC), microcontroller, single-board computer (for example, a Raspberry Pi (TM)), a miniPC, or any other suitable processor hardware. The processing module 13, 14 can be implemented within separate hardware or as functionality of the same hardware. Typically, the hardware comprises input/output ports (I/O ports) which can interface with the controllable features of the system 10, thereby enabling the processing module 13, 14 to implement the functionality herein described.

According to an embodiment, a power supply of the system 10 comprises a low voltage grid connected power supply or a solar power generator and a battery. Said solar power generator may be configured to charge the battery and/or power the system 10 directly. The battery can be configured to provide a power supply to the system 10 in an event of a low to no energy output of the solar power generator.

According to an embodiment, the system 10 is configured for recording data corresponding to the measured environment variable into memory (typically time stamped) and/or communicating said measured environment variable to an external computer. The communication may be by a wired or wireless data communication, for example, selected from mobile broadband options such as 4G or 5G, wired ethernet or DSL, or other wireless technologies such as LoRa (trade mark) LPWAN (Low Power Wide Area Network), or an alternative LPWAN such as a SIGFOX (trade mark) LPWAN or an Ingenu (trade mark) RPMA (Random Phase Multiple Access) LPWAN, and WiFi (in particular, directed WiFi).

Figure 6:
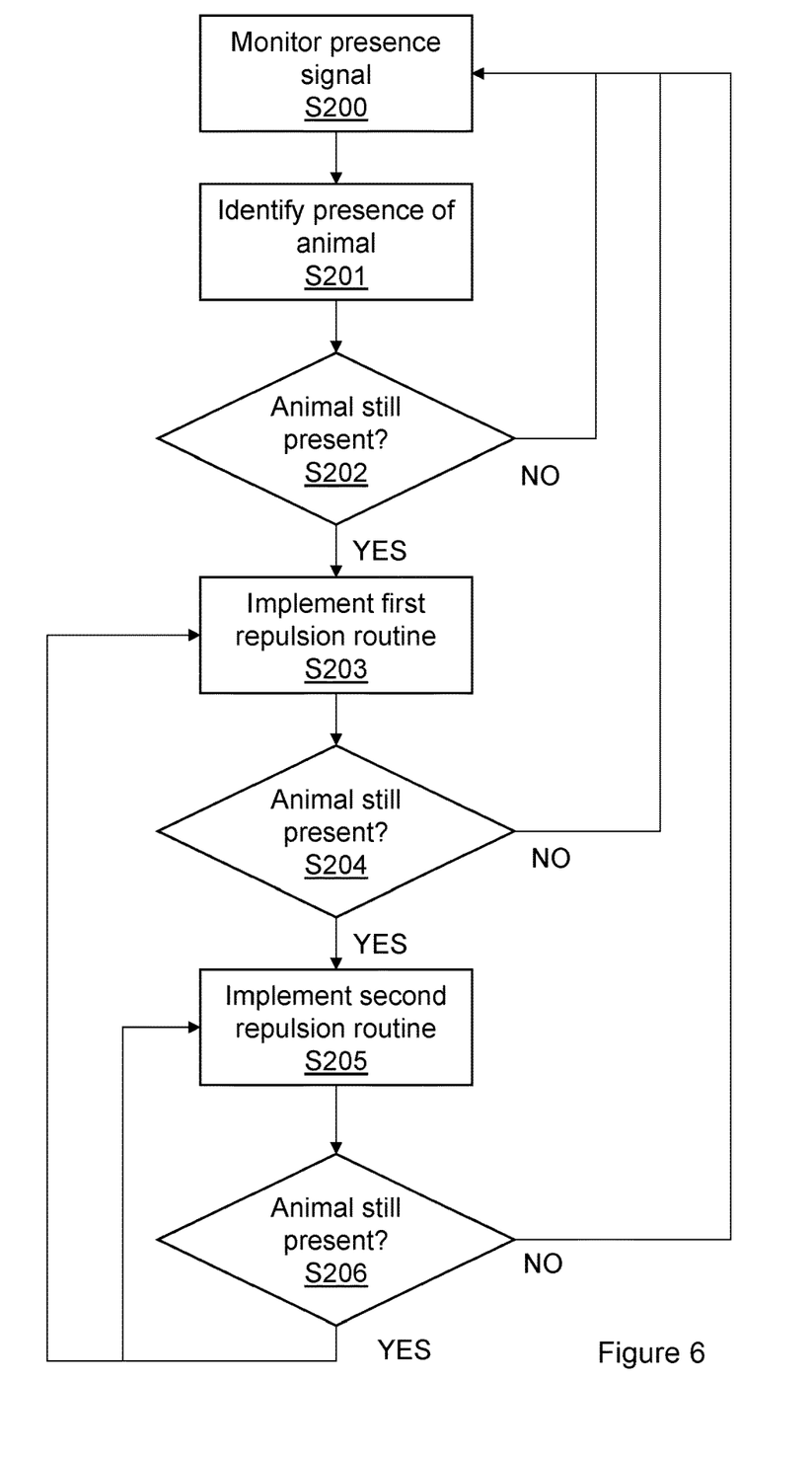
FIG. 6 shows another method implemented by a deterrence processing module according to an embodiment.

FIG. 6 shows a method for deterring animals according to an embodiment, comprising a first repulsion event and a second repulsion event. For example, the first repulsion event comprises a non-physical repulsion action such as an audible repulsion action, a video repulsion action, or a combination of the two, and the second repulsion event comprises a physical interference action.

At step S200, the deterrence processing module 13 monitors the presence signal received from the detector system 11.

At step S201, the deterrence processing module 13 identifies, from the presence signal, an instance of an animal being detected within the vicinity of the environment monitoring apparatus 20.

Optionally, at step S202, the deterrence processing module 13 performs a temporal check to determine if the presence signal has indicated the presence of the animal for at least a predefined time.

In this case, in response to the predefined time elapsing with the animal still being detected as present, the deterrence processing module 13 proceeds to implement the first repulsion event, at step S203. Where the optional temporal check is not utilised, the method proceeds directly to step S203. The first repulsion event may be implemented for a predefined period of time.

The deterrence processing module 13 then checks for the presence of the animal after a predefined time from initiating the first repulsion event, at step S204. The predefined time may be equal to a time period over which the first repulsion event is performed or may be a different time, depending on the embodiment.

If the animal is not detected as present, the method reverts to step S200.

On the other hand, if the animal is still present, the method proceeds to step S205. Here, the second repulsion event is performed—for example, a physical repulsion action is performed which may result in a physical interference with the animal.

The deterrence processing module 13 then checks for the presence of the animal after a predefined time from initiating the second repulsion event, at step S206. The predefined time may be equal to a time period over which the second repulsion event is performed or may be a different time, depending on the embodiment.

If the animal is not detected as present, the method reverts to step S200. On the other hand, if the animal is still present, the method reverts to step S205 or step S203, depending on the embodiment.

Other physical repulsion actions are envisaged, depending on the embodiment. For example, in an embodiment not comprising self-cleaning system, a moveable arm may be provided that is similar in operation to cleaning arm 40, except that, no nozzle 42, reservoir 43, pump 44, or conduit 45 is provided.

An advantage of two or more repulsion events may be that a relatively low power and/or low intervention initial repulsion event may, in some cases, be sufficient to deter an animal. However, if the initial repulsion event is unsuccessful, the system 10 has capacity to escalate the repulsion using the subsequent repulsion event—which may involve physical movement. An advantage of utilising a non-physical repulsion action as the initial repulsion action is that it may reduce the instances of wear due to physical movement of components of the system 10.

The deterrence system 10 can be utilised within a solar farm. The solar farm may be provided with one or more environment monitoring apparatuses 20 configured to assist in local weather forecasting, for example, by including an upward facing camera (optical sensor 21) configured to image the sky. The deterrence system 10 can be utilised to deter animals, particularly birds, from interfering with the operation of the optical sensor 21 by deterring the animals from resting on or otherwise coming into contact with the environment monitoring apparatuses 20. Solar farms are often located in remote or semi-remote locations, where it is impractical for people to visit regularly enough to provide cleaning of the environment monitoring apparatuses 20—the deterrence system 10 may therefore reduce the rate at which impurities are deposited onto the environment monitoring apparatuses 20 due to animals.

The system 10 can be configured to record, in a memory, a log recording times at which a repulsion event has occurred. In an embodiment in which a cleaning arm 40 is moved in accordance with at least one repulsion action, a record of a time at which this occurs may enable correlation with data obtained from the environment monitoring apparatus. For example, this may enable subsequent processing to exclude data that is contemporaneous with the movement of the cleaning arm 40. In such an embodiment, a log may also be made of times at which a cleaning action has occurred, for similar reasons. In addition, or alternatively, the system 10 can communicate the record to an external computer (where applicable).

The system 10 also can comprise a communication system (not shown) which is configured to communicate between the external computer (when located remotely) and system 10, namely the self-cleaning system or the deterrence system. Specifically, the self-cleaning system or deterrence system can be configured to receive commands from the external computer to control one or more of the cleaning processing system 14, deterrence processing system 13, environment monitoring apparatus 20, repulsion system 12 and/or the self-cleaning system remotely. In an example, the external computer may issue commands to activate or deactivate one or more of the systems, to put it to sleep, or to perform additional actions as required.

The communication system may also allow communication and monitoring of various events by the external computer, such as detection of presence of animals, level of water in the reservoir 43, charging cycles of the battery, instances of self-cleaning event, instances of repulsion events and the like, such as may be recorded in a log by the system 10. In particular, this information may be advantageously beneficial in identifying the particular requirements of a deployed system 10. For example, one system 10 may require a larger battery due to a larger number of required repulsion events when compared to another system 10, simply due to location, and this can be identified via such monitoring communications.

Further modifications can be made without departing from the spirit and scope of the specification. For example, the system 10 may be configured to account for a relative distance of an animal to the environment monitoring apparatus 20 when selecting between two or more different repulsion events (see, for comparison, the method of FIG. 6). Accordingly, the detector system 11 may be configured to determine a relative distance of an animal as well as the presence of the animal. The system 10 can be configured to apply one repulsion event when the animal is present at a first distance and another repulsion event when the animal is present at a second distance. Advantageously, such a configuration may enable a non-physical repulsion action to occur when the animal is still some distance from the environment monitoring apparatus 20 and a physical repulsion action when the animal is closer to the environment monitoring apparatus 20.

The invention claimed is:

1. A deterrence and self-cleaning system for deterring animals from a vicinity of an environmental monitoring apparatus and cleaning the environmental monitoring apparatus, the system comprising:

a cleaning arm having one or more nozzles;
a drive unit configured to move the cleaning arm about a path;
a reservoir in fluid communication with the nozzle;
a pump; and
a cleaning processing module configured to control operation of the drive unit and the pump,
wherein the cleaning processing module is operative to cause the deterrence and self-cleaning system to perform a cleaning action comprising:
controlling the drive unit to move the cleaning arm about the path; and
controlling the pump to cause a movement of liquid from the reservoir to the one or more nozzles such that the liquid exits the one or more nozzles,
wherein the path and one or more nozzles are configured such that the liquid is caused to contact an active area of the environment monitoring apparatus, thereby causing cleaning of the environment monitoring apparatus,
a detector system comprising at least one sensor configured to generate a presence signal indicative of the presence of an object within a predefined vicinity of the active area of the environment monitoring apparatus;
a deterrence processing system; and
a repulsion system,
wherein the deterrence processing system is configured to:
monitor the presence signal;
determine, from the presence signal, the presence of an object within the predefined vicinity of the environment monitoring apparatus; and
communicate a command for the repulsion system to perform a sequence of one or more repulsion events actions in response to determining that an object is present, and
wherein the repulsion system is configured to:
perform one or more repulsion events responsive to receipt of the command from the deterrence processing system,
wherein at least one repulsion event of the one or more repulsion events is a physical repulsion action comprising moving the cleaning arm through the path and in which at least a portion of the cleaning arm moves within the vicinity of the active area of the environment monitoring apparatus,
wherein the physical repulsion event involves physically interfering with the animal solely by movement of the cleaning arm and without the use of liquid for repulsion.

2. The deterrence and self-cleaning system as claimed in claim 1, wherein the deterrence processing system is further configured to:
perform a first temporal check to determine whether the presence signal has indicated the presence of the object for at least a first predefined time,
and wherein the command is only communicated when the temporal check determines that the object has been present for the predefined time.

3. The deterrence and self-cleaning system as claimed in claim 1, wherein the sequence comprises one repulsion event and wherein the one repulsion event comprises one or more of: at least one non-physical repulsion action; and the physical repulsion action.

4. The deterrence and self-cleaning system as claimed in claim 3, wherein the at least one non-physical repulsion actions are selected from a visual repulsion action and an audible repulsion action.

5. The deterrence and self-cleaning system as claimed in claim 1, wherein the sequence comprises at least an initial repulsion event and a subsequent repulsion event and wherein the deterrence processing system is further configured to:
communicate a first command for the repulsion system to perform the initial repulsion event in response to determining that an object is present;
perform a second temporal check to determine whether the presence signal has indicated the presence of the object for at least a second predefined time subsequent to the performance of the initial repulsion event;
communicate a second command for the repulsion system to perform the subsequent repulsion event in response to determining that the object is still present after the second predefined time.

6. The deterrence and self-cleaning system as claimed in claim 5, wherein the initial repulsion event comprises one or both of: a visual repulsion action; and an audible repulsion action.

7. The deterrence and self-cleaning system as claimed in claim 5, wherein the subsequent repulsion event comprises the physical repulsion action.

8. The deterrence and self-cleaning system as claimed in claim 1, wherein the environment monitoring apparatus is mounted on a structure, such as a pole, and/or configured for obtaining sensor measurements of at least a portion of the sky, such as a skycam or pyranometer.

9. The deterrence and self-cleaning system as claimed in claim 1, wherein the cleaning arm and nozzle is located in proximity to the environment monitoring apparatus and wherein the reservoir is found in proximity to a base of the structure.

10. The deterrence and self-cleaning system as claimed in claim 1, wherein the cleaning processing module is configured to control cleaning of the environment monitoring apparatus periodically and/or according to a predefined schedule.

11. The deterrence and self-cleaning system as claimed in claim 1, wherein the environment monitoring apparatus comprises an optical apparatus or a substantially upward facing sensing portion.

12. The deterrence and self-cleaning system as claimed in claim 1, wherein the nozzle is one of multiple nozzles, the system further comprising a valve system comprising at least one valve for controlling activation of the multiple nozzles, wherein an activated nozzle allows liquid to exit, and
wherein the cleaning processing module is further configured to:
control the pump and valve(s) to cause a movement of liquid from the reservoir to selected one or more nozzles such that the liquid exits said selected nozzle(s) to contact a part of the active area of the environment monitoring apparatus, and thereafter cause a further movement of liquid to another selected one or more of the multiple nozzles such that the liquid contacts another part of the active area.

13. The deterrence and self-cleaning system as claimed in claim 12 wherein the cleaning processing module is configured to control the pump and valve(s) to cause movement of liquid such that it is directed to individual nozzles in succession thereby performing a sequence of nozzle emissions such that the substantially the entire active area is contacted.

14. The deterrence and self-cleaning system as claimed in claim 12, wherein the cleaning arm is one of multiple cleaning arms and/or the sensing portion is one of multiple sensing portions.

15. The deterrence and self-cleaning system as claimed in claim 14, wherein the or each cleaning arm has multiple nozzles or heads for cleaning the multiple sensing portions.

16. The deterrence and self-cleaning system as claimed in claim 1, further comprising a communication system configured to communicate between an external computer and the self-cleaning system; and
    wherein the self-cleaning system is further configured to receive commands from the external computer via the communication system for controlling the cleaning processing system, environment monitoring apparatus and/or self-cleaning system remotely, and/or to communicate monitoring information.

17. A solar farm comprising one or more deterrence and self-cleaning systems, wherein the one or more deterrence and self-cleaning systems are as claimed in claim 1.

18. The deterrence and self-cleaning system as claimed in claim 1 further comprising a distance discrimination system, wherein the distance discrimination system is configured to:
    determine a distance between the environment monitoring apparatus and a detected object;
    communicate a command for the repulsion system to perform one or more repulsion event only in response to determining that the object is further than a predefined minimum distance.

19. A deterrence and self-cleaning system for deterring animals from a vicinity of an environmental monitoring apparatus and cleaning the environmental monitoring apparatus, the system comprising:
    a cleaning arm having one or more nozzles;
    a drive unit configured to move the cleaning arm about a path;
    a reservoir in fluid communication with the nozzle;
    a pump; and
    a cleaning processing module configured to control operation of the drive unit and the pump,
    wherein the cleaning processing module is configured to perform a cleaning action comprising:
        controlling the drive unit to move the cleaning arm about the path; and
        controlling the pump to cause a movement of liquid from the reservoir to the one or more nozzles such that the liquid exits the one or more nozzles,
    wherein the path and one or more nozzles are configured such that the liquid is caused to contact an active area of the environment monitoring apparatus, thereby causing cleaning of the environment monitoring apparatus,
    a detector system comprising at least one sensor configured to generate a presence signal indicative of the presence of an object within a predefined vicinity of the active area of the environment monitoring apparatus;
    a deterrence processing system; and
    a repulsion system,
    wherein the deterrence processing system is configured to:
        monitor the presence signal;
        determine, from the presence signal, the presence of an object within the predefined vicinity of the environment monitoring apparatus; and
        communicate a command for the repulsion system to perform a sequence of one or more repulsion events actions in response to determining that an object is present, and
    wherein the repulsion system is configured to:
        perform one or more repulsion events responsive to receipt of the command from the deterrence processing system,
        wherein at least one repulsion event is a physical repulsion action comprising moving the cleaning arm through the path and in which at least a portion of the cleaning arm moves within the vicinity of the active area of the environment monitoring apparatus,
        wherein the physical repulsion action and the cleaning action are alternating actions configured to deter animals and clean the environmental monitoring apparatus thereby keeping the environmental monitoring apparatus free of soiling.

20. The deterrence and self-cleaning system as claimed in claim 19, wherein the environment monitoring apparatus comprises an optical apparatus or a substantially upward facing sensing portion.

21. The deterrence and self-cleaning system as claimed in claim 19, wherein the one or more nozzles is one of multiple nozzles, the system further comprising a valve system comprising at least one valve for controlling activation of the multiple nozzles, wherein an activated nozzle allows liquid to exit, and
    wherein the cleaning processing module is further configured to:
        control the pump and valve(s) to cause a movement of liquid from the reservoir to selected one or more nozzles such that the liquid exits said selected nozzle(s) to contact a part of the active area of the environment monitoring apparatus, and thereafter cause a further movement of liquid to another selected one or more of the multiple nozzles such that the liquid contacts another part of the active area.

22. The deterrence and self-cleaning system as claimed in claim 21, wherein the cleaning processing module is configured to control the pump and valve(s) to cause movement of liquid such that it is directed to individual nozzles in succession thereby performing a sequence of nozzle emissions such that the substantially the entire active area is contacted.

23. The deterrence and self-cleaning system as claimed in claim 20, wherein the cleaning arm is one of multiple cleaning arms and/or the sensing portion is one of multiple sensing portions, or wherein the or each cleaning arm has multiple nozzles or heads for cleaning the multiple sensing portions.

24. A solar farm comprising one or more deterrence and self-cleaning systems, wherein the one or more deterrence and self-cleaning systems are as claimed in claim 19.

* * * * *